Jan. 19, 1932.  F. W. W. HIGHFIELD  1,841,892
TESTING MEANS
Filed Feb. 11, 1931
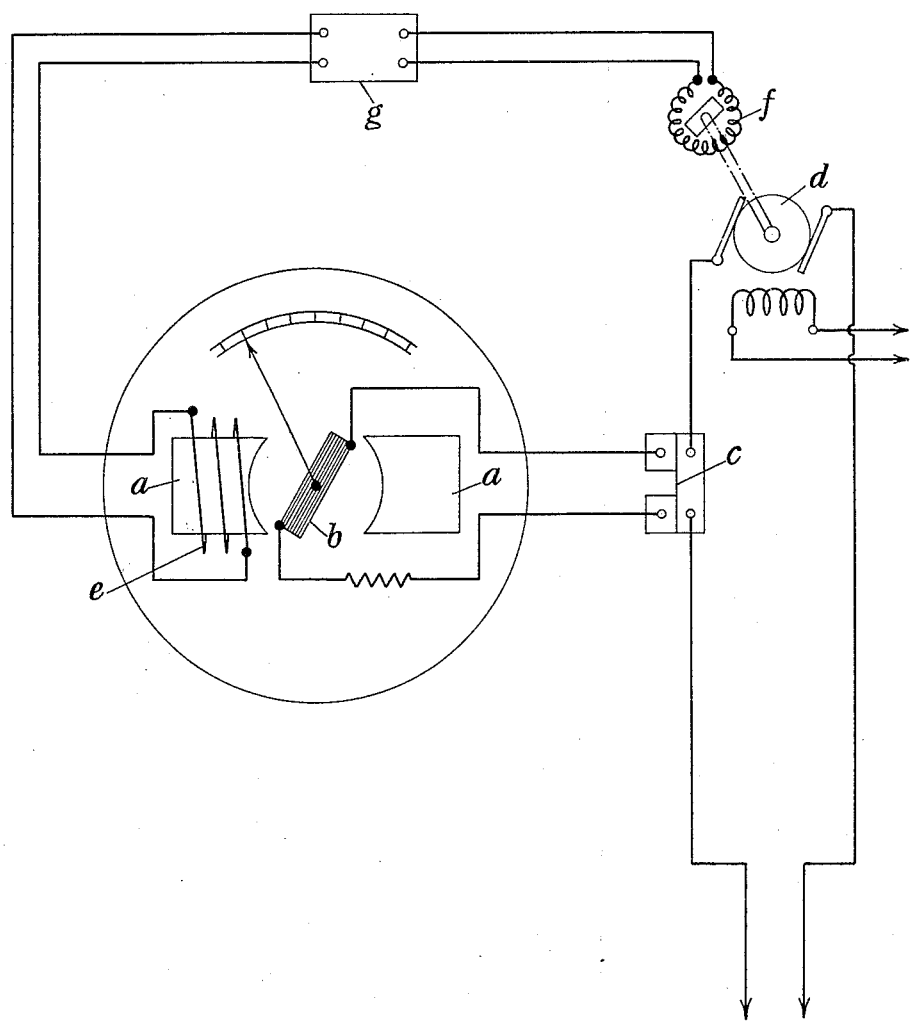
F. W. W. Highfield
INVENTOR
By: Marks & Clerk
Attys.

Patented Jan. 19, 1932

1,841,892

UNITED STATES PATENT OFFICE

FRANK WILLIAM WOOTTON HIGHFIELD, OF COVENTRY, ENGLAND

TESTING MEANS

Application filed February 11, 1931, Serial No. 515,078, and in Great Britain February 17, 1930.

This invention has for its object to provide a power meter of simple and reliable construction adapted for use more particularly with the dynamo electric machines employed for testing internal combustion engines and other prime movers. Such dynamos are adapted to develop power at a fixed voltage, the current generated being absorbed in a power supply system or by any other convenient means. A difficulty which prevents the successful use of ordinary wattmeters for this purpose is due to the fact that the energy generated by the dynamo is not strictly proportional to the energy developed by the prime mover at all speeds, as the iron losses in the dynamo are variable and increase with the speed.

I have already described in the specification of my application for Letters Patent No. 1,807,530, certain methods whereby wattmeters can be successfully adapted for such purposes as those above-mentioned. The present invention is concerned with obtaining the desired results in a simpler and less expensive manner which is well suited for many practical requirements.

The invention comprises the combination of a moving coil instrument of the ammeter type provided with a permanent magnet, a compensating coil or shunt whereby the field of the magnet can be varied, and an auxiliary dynamo such that the voltage generated by it is proportional to its speed of rotation, this dynamo being connected to the compensating coil or shunt and arranged to rotate at a speed which is co-ordinated with that of the dynamo to which the moving coil of the wattmeter is connected.

The accompanying drawing illustrates diagrammatically one mode of carrying the invention into effect.

Referring to the drawing, I employ a moving coil instrument the field of which is provided by a permanent magnet $a$. The moving coil $b$ of this instrument is connected like an ammeter across a shunt $c$ in the armature circuit of the main direct current dynamo $d$. Ordinarily the dynamos used for testing prime movers are separately excited, and the current required for field excitation is therefore not included in that which passes through the measuring instrument in the armature circuit.

In combination with the magnet $a$ is arranged a winding $e$ which with increase of dynamo speed receives current for strengthening the magnet field from a small secondary generator $f$ which is connected directly or indirectly to the dynamo and whose characteristic is such that the voltage generated by it is proportional to the speed. By suitably adjusting the winding $e$ or the current supplied to it, the instrument can readily be adapted to compensate the effect of iron losses in the dynamo and enable the instrument to give a sufficiently accurate indication of the power developed by the dynamo over a wide range. In the arrangement shown, the dynamo $f$ is of the alternating current type, and current from this dynamo is taken to the winding $e$ through a rectifier $g$.

The instrument is conveniently calibrated to give direct readings in terms of horse power.

Having thus described my invention what I claim as new and desire to secure by Letters Patent is:—

1. In testing means, the combination of an indicating instrument of the ammeter type, consisting in part of a permanent magnet, a moving coil, and a compensating coil on the permanent magnet, an alternating dynamo the voltage generated by which being proportional to its speed of rotation, means for supplying direct current from the said dynamo to the said compensating winding, a direct current dynamo and means for supplying current to the moving coil from the direct current dynamo, substantially as described.

2. In testing means, the combination of an indicating instrument of the ammeter type, consisting in part of a permanent magnet, a moving coil, and a compensating coil on the permanent magnet, an alternating current dynamo the voltage generated by which being proportional to its speed of rotation, a rectifier connected to the said dynamo, means connecting the rectifier to the said compensating winding, a direct current dynamo and means for supplying current to the moving coil from the direct current dynamo substantially as described.

3. In means for testing prime movers, the combination of a main direct current dynamo to be driven by the prime mover, a secondary alternating current dynamo, means for driving said secondary dynamo at a speed which is in fixed relation to that of the main dynamo, the secondary dynamo being so constructed that the voltage generated thereby is proportional to its speed of rotation, an indicating instrument of the ammeter type consisting in part of a moving coil, a permanent magnet and a compensating coil on the magnet, means for supplying direct current from the secondary dynamo to the compensating winding, and means for supplying current from the main dynamo to the moving coil, substantially as described.

In testimony whereof I have signed my name to this specification.

FRANK WILLIAM WOOTTON HIGHFIELD.